(12) United States Patent
Lee et al.

(10) Patent No.: US 12,175,557 B2
(45) Date of Patent: Dec. 24, 2024

(54) CORRECTING POSITION OF A MOBILE DEVICE USING A MOBILE REFERENCE

(71) Applicant: Trimble Inc., Sunnyvale, CA (US)

(72) Inventors: Young Jin Lee, Westminster, CO (US); Scott Graybill, Arvada, CO (US); Matthew Fonken, Federal Heights, CO (US); Ashish Dhital, Westminster, CO (US); Jordan Lawver, Denver, CO (US); Kent Kahle, Fallbrook, CA (US)

(73) Assignee: Trimble Inc., Westminster, CO (US)

( * ) Notice: Subject to any disclaimer, the term of this patent is extended or adjusted under 35 U.S.C. 154(b) by 312 days.

(21) Appl. No.: 17/733,186

(22) Filed: Apr. 29, 2022

(65) Prior Publication Data

US 2023/0351541 A1 Nov. 2, 2023

(51) Int. Cl.
| | |
|---|---|
| *G06T 1/00* | (2006.01) |
| *G01C 15/06* | (2006.01) |
| *G01S 5/02* | (2010.01) |
| *G01S 19/01* | (2010.01) |
| *G01S 19/48* | (2010.01) |

(Continued)

(52) U.S. Cl.
CPC .......... *G06T 1/0014* (2013.01); *G01C 15/06* (2013.01); *G01S 5/0263* (2013.01); *G01S 19/01* (2013.01); *G01S 19/48* (2013.01); *G06K 7/1417* (2013.01); *G06T 19/006* (2013.01)

(58) Field of Classification Search
CPC ....... G01C 15/002; G01C 15/06; G01S 19/01; G01S 19/48; G01S 5/0263; G06K 7/1417; G06T 1/0014; G06T 19/006
See application file for complete search history.

(56) References Cited

U.S. PATENT DOCUMENTS

| | | |
|---|---|---|
| 5,901,236 A | 5/1999 | Mizui |
| 6,608,688 B1 | 8/2003 | Faul et al. |

(Continued)

FOREIGN PATENT DOCUMENTS

| | | |
|---|---|---|
| CN | 101965498 A | 2/2011 |
| CN | 1761855 A | 2/2012 |

(Continued)

OTHER PUBLICATIONS

U.S. Appl. No. 17/308,431 Non-Final Office Action, mailed Oct. 5, 2021, 24 pages.

(Continued)

*Primary Examiner* — Tri T Ton
(74) *Attorney, Agent, or Firm* — Kilpatrick Townsend & Stockton LLP

(57) ABSTRACT

An augmented-reality device is aligned with an environment using a correction source. A position of a reflector (or other device that is part of a surveying system) coupled with a surveying rod is measured in relation to a correction. A position of a visual design, which is coupled with the surveying rod, is measured in relation to an augmented-reality device, based on an image of the visual design acquired by the augmented-reality device. A coordinate system of the augmented-reality device is aligned with the environment based on the position of the reflector in relation to the correction source, the position of the visual design in relation to the augmented-reality device, and an offset between the reflector and visual design.

20 Claims, 8 Drawing Sheets

(51) Int. Cl.
*G06K 7/14* (2006.01)
*G06T 19/00* (2011.01)

(56) References Cited

U.S. PATENT DOCUMENTS

| | | | |
|---|---|---|---|
| 8,553,212 | B2 | 10/2013 | Jaeger et al. |
| 11,092,434 | B2 | 8/2021 | Carlén et al. |
| 11,221,217 | B1 | 1/2022 | Kahle et al. |
| 11,360,310 | B2 | 6/2022 | Lawver et al. |
| 11,373,381 | B1 | 6/2022 | Kahle et al. |
| 2006/0012777 | A1 | 1/2006 | Talbot et al. |
| 2008/0252907 | A1 | 10/2008 | Sehr |
| 2012/0195060 | A1 | 8/2012 | Gregory et al. |
| 2012/0272536 | A1 | 11/2012 | Nishita |
| 2015/0185018 | A1 | 7/2015 | Hesch et al. |
| 2015/0276402 | A1 | 10/2015 | Grasser et al. |
| 2015/0316375 | A1 | 11/2015 | Winter |
| 2016/0033270 | A1 | 2/2016 | Von Matern |
| 2017/0337743 | A1 | 11/2017 | Metzler et al. |
| 2018/0095174 | A1 | 4/2018 | Mertz et al. |
| 2018/0329040 | A1 | 11/2018 | Ohtomo et al. |
| 2019/0094021 | A1 | 3/2019 | Singer |
| 2019/0154805 | A1 | 5/2019 | Ohtomo et al. |
| 2020/0080842 | A1 | 3/2020 | Rabot et al. |
| 2020/0105043 | A1 | 4/2020 | Yasutomi et al. |
| 2020/0209394 | A1 | 7/2020 | Mark et al. |
| 2020/0293037 | A1 | 9/2020 | Kauppinen et al. |
| 2021/0019953 | A1 | 1/2021 | Pekelny et al. |
| 2021/0055103 | A1 | 2/2021 | Sasaki |
| 2021/0088332 | A1 | 3/2021 | Clarke |
| 2022/0011103 | A1* | 1/2022 | Kahle .................... H04N 23/90 |
| 2022/0011577 | A1 | 1/2022 | Lawver et al. |
| 2022/0187069 | A1* | 6/2022 | Bernhard ............. G01C 15/002 |

FOREIGN PATENT DOCUMENTS

| | | |
|---|---|---|
| CN | 102341671 A | 2/2012 |
| CN | 103415780 A | 11/2013 |
| CN | 103477187 A | 12/2013 |
| CN | 103487039 A | 1/2014 |
| CN | 103827631 A | 5/2014 |
| CN | 104584089 A | 4/2015 |
| CN | 105738930 A | 7/2016 |
| EP | 2 722 647 A1 | 4/2014 |
| EP | 3 591 336 A1 | 1/2020 |
| EP | 3 936 819 A1 | 1/2022 |
| KR | 10-2016-0086244 A | 7/2016 |
| WO | 99/52094 A1 | 10/1999 |
| WO | 2008/145158 A1 | 12/2008 |

OTHER PUBLICATIONS

U.S. Appl. No. 17/308,431 Notice of Allowance, mailed Feb. 22, 2022, 7 pages.
U.S. Appl. No. 16/924,650 Notice of Allowance, mailed Aug. 20, 2021, 8 pages.
International Search Report and Written Opinion for Application No. PCT/EP2017/053252, mailed Jan. 17, 2018, 18 pages.
U.S. Appl. No. 16/505,473 Notice of Allowance mailed Apr. 23, 2021, 9 pages.
Extended European Search Report for Application No. 23170227.5-1009, mailed Aug. 31, 2023, 16 pages.
Kim, S. et al., "3D Point Cloud and BIM-Based Reconstruction for Evaluation of Project by as-Planned and as-Built," Remote Sensing, vol. 12, No. 1457, published May 4, 2020, 14 pages.
Kumar, G. A. et al., "Sensor Fusion Based Pipeline Inspection for the Augmented Reality System," MDPI, Symmetry, vol. 11, No. 1325, published Oct. 22, 2019, 19 pages.
Velodyne LiDAR PUCK™, downloaded from https://www.amtechs.co.jp/product/VLP-16-PUCK.pdf, 2016, 2 pages.

* cited by examiner

CORRECTING POSITION OF A MOBILE DEVICE USING A MOBILE REFERENCE

BACKGROUND

This disclosure relates in general to surveying systems. Surveying determines positions of points relative to each other and/or to the Earth. Surveying can be used in many applications by land surveyors, construction professionals, and civil engineers. Surveying often uses specialized and/or expensive equipment, such as laser levels, surveying rods, total stations, laser scanners, and GNSS (Global Navigation Satellite System) receivers.

BRIEF SUMMARY

This disclosure relates to surveying, and without limitation to calibrating a mobile device using a mobile reference. The mobile reference provides position information to the mobile device for the mobile device to be oriented to an environment. For example, the mobile device is a head-mounted display (e.g., used to control a total station) and the mobile reference is a surveying rod (e.g., a reflector on a surveying rod). In another example (e.g., at an outdoor construction environment), GPS is used by a piece of equipment (e.g., an excavator) and a visual design on the equipment is used as a mobile reference to calibrate (e.g., align) a position and/or orientation of a mobile device to the environment.

In certain embodiments, an apparatus for aligning an augmented-reality device with an environment comprises a surveying rod; a device coupled with the surveying rod (e.g., a reflector or GNSS receiver); a visual design coupled with the surveying rod at a known offset from the device coupled with the surveying rod; a correction source (e.g., comprising a laser), wherein the correction source is precisely positioned relative to the environment; the augmented-reality device, wherein the augmented-reality device comprises a camera; and/or one or more processors configured to: measure a position of the surveying rod in relation to the correction source (e.g., based on light from the laser of the correction source reflecting from the reflector coupled with the surveying rod); measure a position of the visual design in relation to the augmented-reality device, based on an image of the visual design acquired by the camera of the augmented-reality device; and/or align a coordinate system of the augmented-reality device with respect to the environment, based on calculating the position visual design in relation to augmented-reality device; the position of the surveying rod in relation to the correction source, and/or the known offset from the device coupled with the surveying rod and the visual design. In some embodiments, the design is a two-dimensional, machine-readable code; the two-dimensional, machine-readable code is a QR code or an April Tag; the two-dimensional, machine-readable code is one of a plurality of two-dimensional, machine-readable codes coupled with the surveying rod; the offset between the reflector and the visual design is equal to or less than 5 or 10 centimeters; the offset between the reflector and the visual design is equal to or greater than 20, 25, 30, 40, or 45 centimeters and/or equal to or less than 80, 90, 100, or 150 centimeters; a length of the surveying rod is equal to or greater than 1.7, 1.8, or 2 meters and/or equal to or less than 1.9, 2, or 2.2 meters; a length and/or width of the design is equal to or greater than 1.75 or 2 inches and equal to or less than 4 or 5 inches; the augmented-reality device comprises a display; the augmented-reality device further comprises a model of an object, stored in memory of the augmented-reality device; the one or more processors are further configured to present the model of the object in relation to the environment on the display of the augmented-reality device, based on aligning the coordinate system of the augmented-reality device with respect to the environment; measuring the position of the surveying rod in relation to the correction source comprises measuring a center of the reflector in relation to the correction source; and/or the correction source is a robotic total station. In some embodiments, the augmented-reality device measures a position and orientation of the visual design (code) in the device frame then calculate the reflector position in the device frame using known offset of the visual design from the reflector. Since the position of the reflector is known in the correction source (e.g., GPS or robotic total station) frame, there is a common point in both (device and correction source) frames. Therefore, if there are 2 common points and plane (ground) or 3 common points, two frame can be aligned. In some embodiments, the augmented-reality device maintains its position and orientation in its own frame (e.g., in the device frame, which is always changing; not rigid), in a virtual world. While the correction source (e.g., robotic total station) has its own frame (e.g., RTS frame) in the real world. The reflector is visible in the real world by the correction source (e.g., the position of the reflector is measurable by the robotic total station) while the code is visible in the virtual world by the mobile device since the offset between the code and the reflector in the real world (and the virtual world) is known, the position of the reflector in the virtual world can be calculated. Therefore, the positions of the reflector as common points between the real world and the virtual world can be used.

In certain embodiments, a method for aligning an augmented-reality device with an environment comprises: measuring a position of a surveying rod in relation to a correction source, based on light from a laser of the correction source reflecting from a reflector coupled with the surveying rod; measuring a position of the surveying rod in relation to the augmented-reality device, based on an image of a visual design coupled with the surveying rod acquired by the camera of the augmented-reality device; and/or aligning a coordinate system of the augmented-reality device with respect to the environment, based measuring the position of the surveying rod in relation to the correction source and measuring the position the surveying rod in relation to the augmented-reality device (e.g., using a known offset of the visual design from the reflector). In some embodiments, the method further comprises presenting a model of an object in relation to the environment on a display of the augmented-reality device, based on aligning the coordinate system of the augmented-reality device with respect to the environment. In some embodiments, the augmented-reality device maintains its own frame (device frame) and the device frame is aligned with the correction source frame (e.g., to the RTS frame) when the augmented-reality device detects the code and a robotic total station measures current reflector position.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
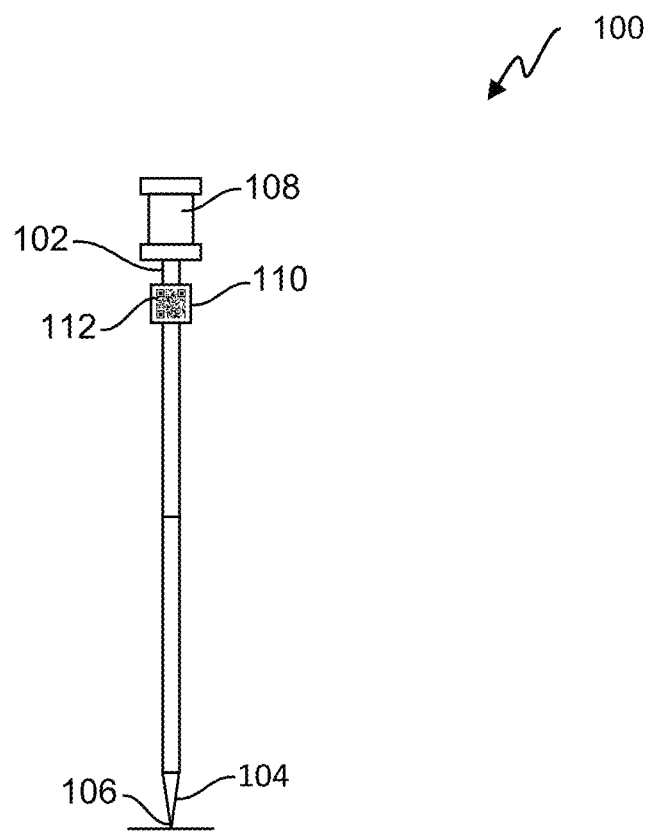
FIG. 1 depicts an embodiment of a surveying rod with a reflector and a tracking object having a visual design.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

This disclosure, without limitation, relates to calibrating a head-mounted display (e.g., XR10 from Trimble, which includes a HoloLens 2) using a surveying rod and a correction source, such as a total station. A reflector is coupled with the surveying rod. A visual design is coupled with the surveying rod at an offset from the reflector. There is no relative movement between the visual design and the reflector during measurements (e.g., the visual design is fixedly coupled with the surveying rod; the offset is fixed). The head-mounted display uses cameras to acquire images of the visual design. The head-mounted display calculates a position of the visual design with respect to the head-mounted display based on the images acquired of the visual design. A correction source measures a position of the reflector in relation to the correction source. The head-mounted display (and/or other processing system) receives the position of the reflector in relation to the correction source. A coordinate system of the head-mounted display is aligned with a coordinate system of the correct source based on the position of the visual design with respect to the head-mounted display, the position of the reflector in relation to the correction source, and the offset. The correction source is positioned (e.g., very precisely) within an environment, such that the coordinate system of the correction source is aligned with the environment. Accordingly, the coordinate system of the head-mounted display is aligned (e.g., very precisely) with the environment.

Head-mounted displays can make a local map of an environment. However, as the head-mounted display is moved, the local map can drift, which can introduce measurement errors. Accordingly, it can be beneficial to correct alignment of the local map to an environment. Examples of aligning a local map of a head-mounted display with an environment are provided in commonly owned U.S. patent application Ser. No. 16/924,650, filed on Jul. 8, 2020 and Ser. No. 17/308,431, filed on May 5, 2021, which are incorporated by reference for all purposes.

One possible option for calibrating a head-mounted display with the environment is for the head-mounted display to image a reflector on a surveying rod. For example, some head-mounted displays only know their position every epoch; there is no absolute correction independent of time. One option is to use a reflector of a surveying pole to provide truth to the head-mounted display. However, precisely positioning a reflector using images can be challenging for some head-mounted displays. It can be very hard to find (and/or get position and orientation of) a three-dimensional object from images. While it may be possible, it generally uses more processing power. Thus it can be challenging for the head-mounted display to accurately calculate on offset of the reflector from the head-mounted display. Thus, in some embodiments, a visual design is attached to the surveying rod at a known offset from the reflector. The reflector works well for calculating an offset using a laser (e.g., to the reflector from an EDM of a total station), and the visual design works well for calculating an offset using images (e.g., using images acquired by cameras of the head-mounted display). By having both a visual image and a reflector, two different systems (e.g., an imaging system and an laser-based system) can each more easily calculate offsets to the surveying pole, and align one to the other. More accurate alignment allows for more accurate overlays in the head-mounted display. In some embodiments, using a visual design provides orientation information of the surveying rod. In some embodiments, a head-mounted display positions the reflector using images (e.g., uses more processing power).

In some configurations, an apparatus comprises a surveying rod, a reflector, a visual design, a correction source, and an augmented-reality device. The apparatus aligns a coordinate system of the augmented-reality device with the environment. For example, the reflector and the visual design are positioned on the surveying rod at a known offset from one another. The correction source includes a laser and is precisely positioned in the environment (e.g., the position of the correction source relative to the environment is known). The apparatus measures the position of the surveying rod based on light from the laser of the correction source reflecting off of the reflector. The augmented-reality device includes a camera, and the apparatus measures a position of the augmented-reality device in relation to the surveying rod based on an image of the visual design captured by the camera. In some embodiments, the camera is one of a plurality of cameras and/or the camera (and optionally the plurality of cameras) is a depth camera. The apparatus uses the known offset, the position of the surveying rod, and the relative position of the augmented-reality device to the visual design to align the augmented-reality device with the environment.

The apparatus combines a visual reference and an active reference to find a common frame-of-reference between the augmented-reality device and an object such as the surveying rod. For example, the apparatus leverages image sensors and time-of-flight electronic distance measurement (EDM) sensors to determine precise positions in an environment. For example, the apparatus combines advantages of an EDM sensor of the correction source and the imaging sensor of the augmented-reality device to align a coordinate system of the augmented-reality device to the environment of the correction source and/or to improve an accuracy and/or precision of measurements in the environment. The apparatus allows for or otherwise generates precision workflows and precise (e.g., within millimeter or centimeter accuracy and/or precision) data overlays. While described with an augmented-reality device (e.g., Trimble's XR10), the apparatus can use other types of controllers to perform the techniques disclosed herein. For example, alternative to Trimble's XR10, the controller can include an augmented-reality handheld device, a mixed-reality handheld device, an iOS and/or Android augmented-reality-enabled device (e.g., a mobile computing device such as a cell phone, other augmented-reality devices, or combinations thereof.

Application examples of the apparatus can include:
while surveying a property, a user (e.g., a surveyor) can use the apparatus to determine precise locations (e.g., within 5 centimeters) with respect to the property, regardless of obstructions;
during dangerous operation of heavy machinery, the user (e.g., an equipment operator) can use the apparatus to remotely control movement or other suitable operation of the heavy machinery without needing to be within or otherwise proximate to the heavy machinery; and/or
while performing construction work, the user (e.g., a foreman) can precisely verify that the construction work was performed and/or completed properly.

Though a robotic total station and a reflector are used in the examples above as a correction source, other correction sources can be used. For example, a GNSS system can be used as the correction source and an offset can be calculated from a GNSS receiver (e.g., a device comprising an antenna configured to receive GNSS signals).

Referring first to FIG. 1, an embodiment of a surveying rod 100 is illustrated. The surveying rod 100 comprises a first end 102 and a second end 104. In some embodiments, the first end 102 is the top of the surveying rod 100, and the second end 104 is the bottom of the surveying rod 100. The second end 104 includes a tip 106 that may be configured to be placed on the ground or other suitable surface for performing surveying or other tasks. A reflector 108 and a tracking object 110 are positioned at the first end 102. In some embodiments, a length of the surveying rod 100 is equal to or greater than 1.7, 1.8, or 2 meters and/or equal to or less than 1.9, 2, or 2.2 meters. The surveying rod 100 can include other components.

As illustrated, the reflector 108 is positioned on the first end 102 (e.g., at the top) of the surveying rod 100, and the tracking object 110 is positioned proximate to (e.g., just below) the reflector 108. Though the reflector is shown at the top of the surveying rod 100 (e.g., so as to be above user so the total station has unobstructed line of site to the reflector 108), the reflector 108 can be positioned at other locations of the surveying rod 100. The reflector 108 is configured to reflect light (e.g., using retroreflectors) from a correction source (e.g., originating from a laser) such as a total station or other suitable correction source.

Figure 3:
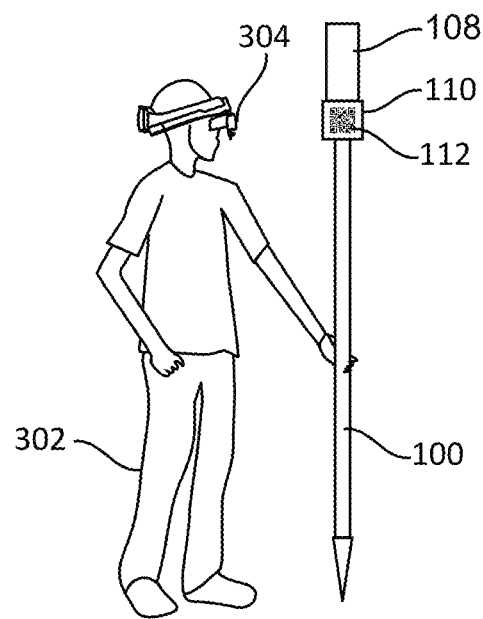
FIG. 3 depicts an embodiment of a tracking object having a visual design positioned on a surveying rod, wherein the visual design is proximate with respect to a reflector.
Figure 4:
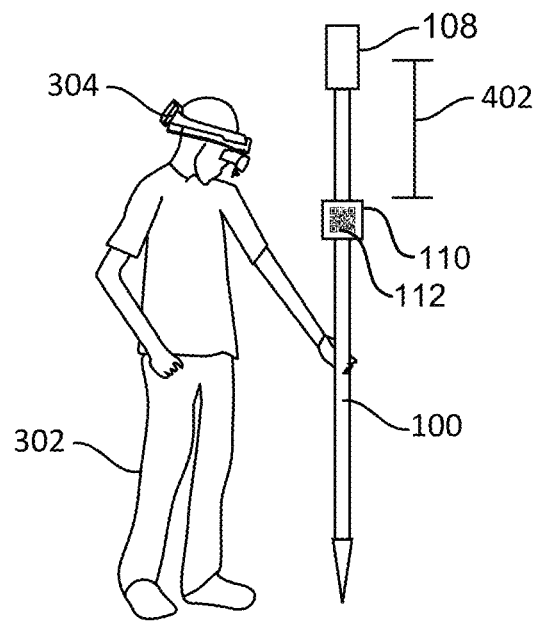
FIG. 4 depicts an embodiment of a tracking object having a visual design positioned on a surveying rod, wherein the visual design is separated from the reflector by a distance.

As illustrated, the tracking object 110 is a box-shaped object (e.g., a cube), having one or more rectangular surfaces. The tracking object 110 is positioned proximate to the reflector 108. In some embodiments, the tracking object 110 can be another shape or include other shaped surfaces (e.g., triangular, wedge-shaped, octagonal, circular, etc.), and the tracking object 110 can be positioned in other locations (e.g., between the first end 102 and the second end 104) with respect to the surveying rod 100. In some embodiments, the tracking object 110 can include a code cube, a code wedge, a cube with colors, patterns or shapes, prisms, and/or other shapes or objects. The surveying rod 100 can include more than one (e.g., two, three, four, etc.) tracking object 110 having visual designs 112 (e.g., two-dimensional, machine-readable codes). For example, the surveying rod 100 can include a first tracking object 110 positioned proximate to the reflector 108 (e.g., as shown in FIG. 3) and a second tracking object positioned a distance from the reflector 108 (e.g., as shown in FIG. 4). In some embodiments, the tracking object 110 may be other components of the surveying rod 100 (or the surveying rod 100 itself; a visual pattern painted on the surveying rod) or a separate device (e.g., machinery). In some embodiments, the tracking object 110 is non-cylindrical and/or has a flat surface. For example, a flat surface is used to more easily apply a sticker containing the visual design (e.g., without wrinkling) and/or to make is easier for image analysis of the tracking object 110 (e.g., using edge detection to ascertain boundaries). In some embodiments, the tracking object 110 has a specified size (e.g., a width of a flat surface), and/or a visual design 112 has a specified size, to provide scale to the augmented-reality device.

As illustrated, the tracking object 110 includes the visual design 112 (e.g., a QR code). The visual design 112 is printed on or otherwise affixed (e.g., a sticker) to at least one side of the tracking object 110. As illustrated, the visual design 112 is printed on one side of the tracking object 110, but the visual design 112 may additionally, or alternatively, be present on other sides of the tracking object 110. For example, the tracking object 110 in a shape of a cube could have four visual designs (on four sides of the cube). The four visual designs could be the same or unique visual designs.

Figure 2:
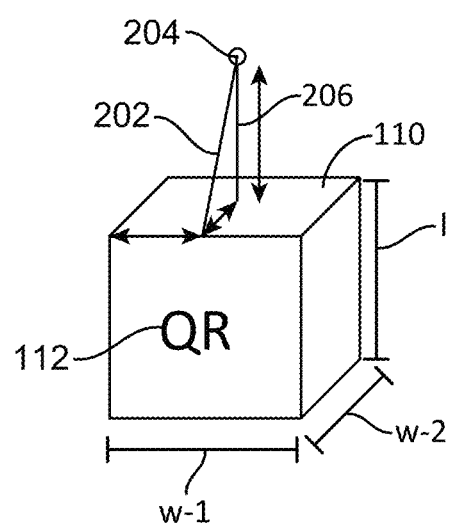
FIG. 2 depicts an embodiment of a tracking object having a visual design at a known offset from a reflector.

FIG. 2 depicts an embodiment of a tracking object 110 having a visual design 112 at a known offset from a reflector. The visual design 112 is printed on or otherwise affixed to the tracking object 110. The visual design 112 can include text, numbers, patterns, and/or other visual features. In some embodiments the visual design 112 is a machine-readable, two-dimensional pattern or code that can be detected by a computing device (e.g., the augmented-reality device). As illustrated in FIG. 1, the visual design 112 is a QR code. In other embodiments, the visual design 112 can include a QR code, an April Tag, other suitable, machine-readable, two-dimensional visual designs, or combination thereof, which are detectable by an augmented-reality device or other suitable controller device with a camera.

The visual design 112 is separated from the reflector of the surveying rod by an offset 202. The offset 202 is characterized by a distance (e.g., 1, 2, or three degrees of translation) and/or an orientation (e.g., 1, 2, or 3 degrees of rotation) between the reflector and the visual design 112. For example, a center of the visual design 112 can be coaxial with a center of the reflector (e.g., one degree of translation), or the visual design can be on a cube or wedge (e.g., with three degrees of translation and/or three degrees of rotation with respect to the reflector). The offset 202 can be a suitable distance between the visual design 112 and the reflector 108. For example, the offset 202 can be from 5 centimeters to 150 centimeters, or other suitable distance. The offset 202 may be selected based on a desired accuracy or precision of point determination in the environment. For example, the accuracy or precision of point determination (e.g., using the apparatus including the augmented-reality device) may be inversely correlated to the offset 202. As the offset 202 is reduced (e.g., as the visual design 112 is placed closer to the center 204 of the reflector), the accuracy or precision of point determination in the environment increases.

The tracking object 110 is illustrated having a first width w−1, a second width w−2, and a length l. The visual design 112 has a width equal to width w and a length equal to length l. In the embodiments shown, the first width w−1 is equal to the second width w−2, though the first width w−1 can be different than the second width w−2 in some geometries. In the embodiment shown, the length l is equal to the first width w, though in other embodiments the length l is not equal to the width w (e.g., depending on a geometry of the tracking object 110).

The width w (and/or the length l) is sized to facilitate detection of the visual design 112 using cameras of augmented-reality device. In some embodiments, the width w is equal to or greater than 1.75 or 2 inches and/or equal to or less than 4 or 5 inches. Applicant has found such ranges provide good imaging features while attached to a surveying rod and imaged using an augmented-reality device while a user holds the surveying rod. For example, if a nominal arm length of the user is 0.6 meters, then a width w of the tracking object 110 can be set to be between two and four inches per each 0.6 meters the augmented-reality device is away from the tracking object 110.

Based on an anticipated distance between a camera of a controlling device and the visual design 112, the width w can be increased, decreased, or a combination thereof for optimizing the accuracy and/or processing speed associated with detecting the visual design 112. For example, the width w can be increased to facilitate detection of the visual design 112 by a camera that is anticipated to be farther away (e.g., compared to an initial position of the controlling device) from the tracking object 110. The tracking object 110 can include other suitable dimensions and components for facilitating detection of the visual design 112.

The offset 202 between the reflector and the visual design 112 can be calculated based on a distance 206 from the center 204 of the reflector to the tracking object 110, the width w of the tracking object, and/or the length l of the tracking object. In some embodiments, an origin of the visual design 112 is a corner of the visual design 112. Thus, to calculate the offset 202, the first width w−1, the second width w−2, and the distance 206 are used (e.g., and the length l is not used).

FIG. 3 depicts an embodiment of a tracking object 110 having a visual design 112 positioned on the surveying rod 100 of FIG. 1 proximate with respect to a reflector 108. As illustrated, a user 302 is using the surveying rod 100. The user 302 can be or include an operator, a supervisor, or other individual (e.g., a surveyor) that may use the surveying rod 100. For example, the user 302 can use the surveying rod 100 (e.g., in combination with a total station or other suitable tool or device) to determine precise points in a geographic area.

As illustrated, the user 302 is wearing an augmented-reality device 304 (e.g., Trimble's XR10) and is looking at the visual design 112. In some embodiments, the augmented-reality device 304 can include Trimble's XR10, an augmented-reality handheld device, a mixed-reality handheld device, an iOS and/or Android augmented-reality-enabled device (e.g., a mobile computing device such as a cell phone), other suitable augmented-reality devices, or combination thereof. The augmented-reality device 304 includes one or more cameras for capturing images (e.g., of the environment, the surveying rod 100, component thereof, etc.). The user 302 can look at or otherwise point the camera of the augmented-reality device 304 at the visual design 112 of the tracking object 110. The camera of the augmented-reality device 304 captures an image of the visual design 112, and the augmented-reality device 304 can use the image to perform various tasks such as correcting positional drift of a virtual world (e.g., generated by the augmented-reality device 304) with respect to the environment.

The tracking object 110 that includes the visual design 112 is positioned, as illustrated in FIG. 3, proximate to the reflector 108. Accordingly, the accuracy and/or precision of measurements provided by the augmented-reality device 304 may be optimized (e.g., minimizing some errors by positioning the visual design 112 as close to the reflector 108 as possible). In some embodiments, proximate is the tracking object 110 touching the reflector 108 and/or separated from the reflector by no more than 2, 5, 10, 15, or 20 centimeters (accordingly the offset of the reflector 108 from the visual design 112 is equal to or less than 5, 10, 15, 20, or 26 centimeters).

However, a usability associated with the surveying rod 100 may not be optimal. For example, while the surveying rod 100 is being used by the user 302, the tracking object 110 may be positioned above (e.g., at a vertical location above the head of) the user 302. Accordingly, to use (e.g., look at) the visual design 112 for correcting positional drift, the user 302 may be required to look up or otherwise away from a normal or comfortable field of view to cause the camera to capture an image of the visual design 112.

FIG. 4 depicts an embodiment of a tracking object 110 having a visual design 112 positioned on the surveying rod 100 a specified or known distance from the reflector 108. As illustrated, the user 302 is using the surveying rod 100. The user 302 is wearing the augmented-reality device 304 and is looking at the visual design 112. The visual design 112 is within a field of view of a camera of the augmented-reality device 304 while the user 302 looks at or near the visual design 112 (e.g., while the user 302 looks at a bubble level or tip 106 of the rod).

The tracking object 110 that includes the visual design 112 is positioned, as illustrated in FIG. 4, a distance 402 (e.g., similar to distance 206 in FIG. 2) away from the reflector 108. The tracking object is positioned the distance 402 away from the reflector so that it is in a position that is more commonly and/or more easily viewed by the user 302. For example, the tracking object 110 is positioned attached to near a bubble level used for leveling the surveying rod 100. Since the user 302 may more frequently look at the bubble level during surveying, the tracking object 110 can be positioned in proximity to the bubble level. In some configurations, the bubble level is the visual design, the visual design is part of the bubble level, and/or the bubble level is part of the visual design. In some embodiments, the distance 402 is equal to or greater than 20, 30, 50, or 75 cm and/or equal to or less than 100, 150, or 200 centimeters. In some embodiments, the surveying rod comprises a bubble level and the visual design 112 is positioned less than 5, 10, 14, 20, or 30 centimeters from the bubble level. In some embodiments, the distance 402 can be chosen or otherwise adjusted to optimize a usability of the apparatus including the surveying rod 100 and the augmented-reality device 304. Accordingly, the usability of the apparatus that includes the augmented-reality device 304, the surveying rod 100, and the like, may be optimized (e.g., made to be easier/more convenient for the user 302 to point a camera of the augmented-reality device 304 at the visual design 112).

The accuracy and/or precision attained by using the surveying rod 100 as illustrated in FIG. 4 may be good but not optimal. For example, while the surveying rod 100 is being used by the user 302, the tracking object 110 may be positioned within a natural line-of-sight of the user 302 such that the user 302 need not look away from the visual design 112 (or more likely to have the visual design 112 be within a field of view of a camera of the augmented-reality device 304) while using the surveying rod 100. For example, the user 302 does not have to keep looking up for the augmented-reality device 304 to image the tracking object 110. In some configurations, one or more cameras are positioned on the augmented-reality device 304 to have upward orientations while the user 304 has a horizontal gaze (e.g., to image the tracking object 110 on the surveying pole 100 in FIG. 3). Accordingly, the apparatus that includes the surveying rod 100 and the augmented-reality device 304 may be easy to use (e.g., easier for the user 302 to use than the embodiment shown in FIG. 3). Due to the position of the visual design 112 in relation to the reflector 108, the accuracy and/or precision of the apparatus having the surveying rod 100 depicted in FIG. 4 may be less than the accuracy and/or precision of the apparatus having the surveying rod 100 depicted in FIG. 3. For example, the accuracy and/or precision of the apparatus associated with FIG. 4 may be about 20%-30% lower than the accuracy and/or precision of the apparatus associated with FIG. 3. In some embodiments, however, the accuracy and/or precision of the apparatus associated with FIG. 4 may still be well within a given tolerance for a particular application (e.g., within 5 centimeters; the accuracy and/or precision of the apparatus associated with FIG. 3 and FIG. 4, respectively, may be from approximately 20 mm to 30 mm and from approximately 25 mm to 35 mm).

Figure 5:
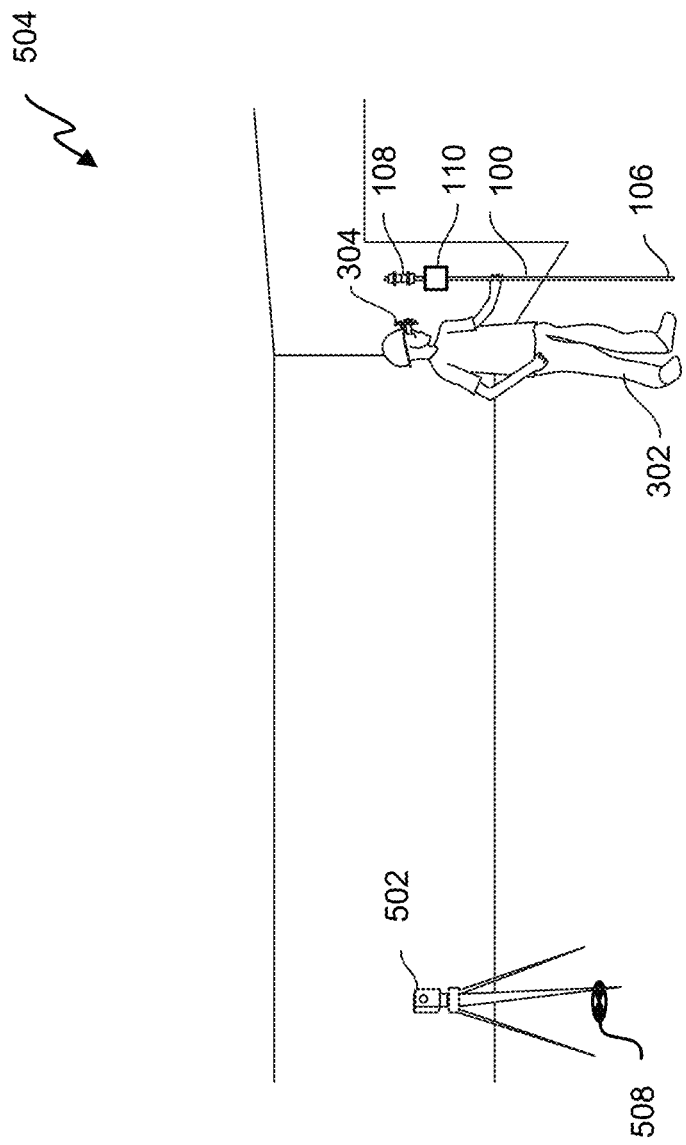
FIG. 5 depicts an embodiment of a correction source positioned with respect to a surveying rod.

FIG. 5 depicts an embodiment of a correction source 502 positioned with respect to a surveying rod 100. In some embodiments, FIG. 5 illustrates an application of the apparatus disclosed herein that includes the correction source 502, the surveying rod 100, the augmented-reality device 304, and/or other suitable components. The application can include using the apparatus to measure precise points in an environment 504, which can include real property that includes buildings. The apparatus can be used for other suitable applications.

As illustrated, the correction source 502 is a robotic total station. In some embodiments, the correction source 502 can be or otherwise include a total station, a laser scanner, EDM, laser source, one or more cameras, one or more radios/ultra-wide band/ultrasonic sources/infrared sources, one or more satellites, other position sensors for determining three-dimensional positions, and/or combinations thereof. The correction source 502 can be selected for optimizing a performance of the apparatus in different applications. For example, the correction source 502 can be selected as the total station for a surveying application involving one or more obstructions, a satellite for a surveying or other similar applications that do not involve obstructions, a camera for an application involving control of heavy machinery, etc. In some embodiments, if a camera is used for the correction source, one or more visual designs are attached to the surveying rod or other equipment.

The correction source 502 is precisely positioned with respect to the environment 504 (e.g., by positioning the correction source 502 at a known height above survey marker 508). The correction source 502 calculates a position of the surveying rod 100 by using an EDM (e.g., causing a laser originating from the correction source 502 to be directed toward the reflector 108 of the surveying rod 100). For example, the correction source 502 can be a total station and can be positioned at a known location within the environment 504. Light from the laser of the correction source 502 is directed outward (e.g., toward the reflector 108). The correction source 502 is used in combination with the reflector 108 to determine a position of the surveying rod 100 with respect to the environment 504. For example, the light from the laser of the correction source 502 can be directed to the reflector 108, which can be used to determine the precise position of the surveying rod 100 within the environment 504. Accordingly, the position of the surveying rod 100 with respect to the environment 504 can be calculated.

The user 302 can look at (or otherwise direct a line-of-sight of the camera of the augmented-reality device 304 toward) the visual design of the tracking object 110 to correct and/or otherwise determine a position of the augmented-reality device 304 with respect to the surveying rod 100. The augmented-reality device 304, the correction source 502, and/or another processing device determines a position of the augmented-reality device 304 (e.g., aligns the augmented-reality device 304 with the environment 504) in relation to the environment 504 by using the known offset (e.g., the offset 202 illustrated in FIG. 2) between the visual design 112 and the reflector 108, the known position of the surveying rod 100 with respect to the environment 504, and the position of the augmented-reality device 304 with respect to the surveying rod 100. During operation, the augmented-reality device 304 can generate a virtual representation of an object in the environment 504 and/or can make measurements in the virtual representation that correspond to the environment 504. The measurements can include precise position measurements of key aspects (e.g., borders, building components, wires/pipes, the tip 106, etc.) of the environment 504. During operation of the augmented-reality device 304, the positions in the virtual representation may drift away from the positions in the environment 504 (e.g., since each newly determined position may be relatively determined with respect to a previous position of a previous time interval). The user 302 can look at (or otherwise direct the line-of-sight of the camera of the augmented-reality device 304 toward) the visual design 112 to correct the drifted positions of the virtual representation. In some embodiments, continuously correcting the virtual representation using the visual design improves the accuracy and/or precision of measurements made by the augmented-reality device 304.

Figure 6:
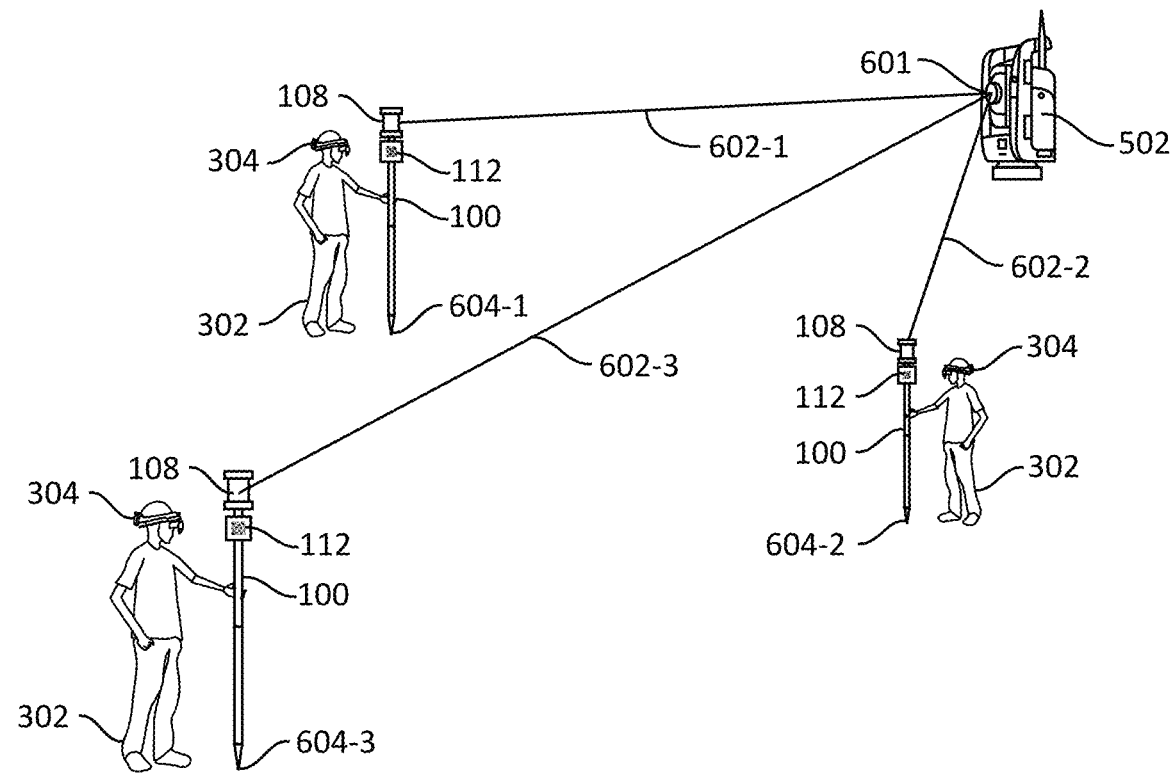
FIG. 6 depicts an embodiment of an augmented-reality device being aligned with a correction source.

FIG. 6 depicts an embodiment of an augmented-reality device 304 being aligned with a correction source 502, using a laser 601. The laser 601 is included in or otherwise controlled by the correction source 502. For example, the correction source 502 (e.g., a total station) can include the laser 601, which emits a laser beam 602 for determining a position of the surveying rod 100 or for other suitable purposes. FIG. 6 illustrates an initialization process for aligning the augmented-reality device 304 with the correction source 502. The initialization process involves the laser 601 emitting a set of laser beams 602 directed toward the surveying rod 100 positioned in a set of different positions 604. In some embodiments, the positions 604 are arbitrary positions.

The user 302 positions the surveying rod 100 at a first position 604-1. The laser 601 emits laser a first laser beam 602-1 toward the surveying rod 100 at the first position 604-1. The first laser beam 602-1 is reflected by the reflector 108 back to the correction source 502. Accordingly, the correction source 502 can calculate a relative position of the surveying rod 100 (e.g., by calculating a position of the reflector 108) while the surveying rod 100 is at the first position 604-1.

The user 302 can then position the surveying rod 100 at a second position 604-2. The laser 601 emits a second laser beam 602-2 toward the surveying rod 100 while at the second position 604-2. The second laser beam 602-2 is reflected by the reflector 108 back to the correction source 502. Accordingly, the correction source 502 can calculate a relative position of the surveying rod 100 (e.g., by calculating a position of the reflector 108) while the surveying rod 100 is at the second position 604-2.

The user 302 can then position the surveying rod 100 at a third position 604-3. The laser 601 emits a third laser beam 602-3 toward the surveying rod 100 while at the third position 604-3. The third laser beam 602-3 is reflected by the reflector 108 back to the correction source 502. Accordingly, the correction source 502 can calculate a relative position of the surveying rod 100 (e.g., by calculating a position of the reflector 108) while the surveying rod 100 is at the third position 604-3.

While the surveying rod 100 is illustrated as being positioned in three separate positions 604, the correction source 502 can be aligned with the reflector 108 using two separate positions (e.g., and using the ground plane), four separate positions, or other suitable amounts of separate positions (e.g., two or more). In some embodiments, initialization uses two known vectors or three points. For example, knowing a vector between two points, based on center positions of a center of the reflector, can provide orientation.

At each position 604, the user 302 looks at (or otherwise directs the line-of-sight of the augmented-reality device 304 toward) the visual design 112 of the surveying rod 100. The augmented-reality device 304 can detect and read the visual design 112 for determining a relative location of the augmented-reality device 304 with respect to the surveying rod 100 (e.g., determining relative location of the reflector 108 with respect to the augmented-reality device 304). Accordingly, the augmented-reality device 304 uses the relative location in combination with the known location of the surveying rod 100 (e.g., of the known location of the reflector 108 determined by the correction source 502) in the environment 504 and the known offset (e.g., the offset 202) between the visual design 112 and the reflector 108 to determine the location of the augmented-reality device 304 in the environment 504.

In some embodiments, the correction source 502 determines the positions 604 of the surveying rod 100, and the augmented-reality device 304 uses the positions 604 to determine an orientation of the augmented-reality device 304 (e.g., by aligning a first coordinate system associated with the augmented-reality device 304 to a second coordinate system associated with the correction source 502). The first coordinate system can be or otherwise include a coordinate system of a virtual representation, generated by the augmented-reality device 304, of the environment 504. The second coordinate system can be or otherwise include a natural coordinate system of the environment 504. The augmented-reality device 304 may map (or otherwise adjust for matching) the first coordinate system of the virtual representation to the second coordinate system of the environment 504. Accordingly, the orientation of the augmented-reality device 304 can be determined (e.g., based on the alignment of the first coordinate system and the second coordinate system). In some embodiments, the coordinate system of the correction source is oriented first. For example, a total station is aligned with the environment before the augmented-reality device is oriented with the environment (e.g., the user cannot get to a control point or does not have access to a control point). In some embodiments, the augmented-reality device is aligned with the correction source before the correction source is oriented with the environment. In some embodiments, the augmented-reality device is oriented with the environment before or after the correction source is oriented with the environment (e.g., the augmented-reality device uses a picture of a control point) and then the augmented-reality device is aligned with the correction source later (e.g., the augmented-reality device loses tracking or drifts between control points). In some embodiments, a user may desire a more precise overlay with shorter baselines before starting layer.

Figure 7:
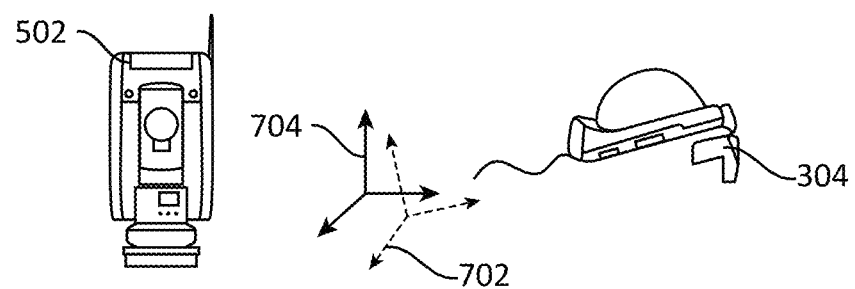
FIG. 7 depicts an embodiment of an augmented-reality device with a first coordinate system aligned to a second coordinate system corresponding to a correction source.

FIG. 7 depicts an embodiment of an augmented-reality device 304 with a first coordinate system 702 aligned to a second coordinate system 704 associated with a correction source 502. In some embodiments, the first coordinate system 702 corresponds to a virtual representation, generated by the augmented-reality device 304, of the environment 504, and the second coordinate system 704 corresponds to the environment 504 (e.g., as measured by the correction source 502).

The augmented-reality device 304 can be used to determine a set of different (e.g., random or arbitrary) points in an environment 504. In some embodiments, the set of points can include two or more points (e.g., two points, three points, four points, etc.), and the augmented-reality device 304 determines a first plane in the first coordinate system 702 based on the set of points. The augmented-reality device 304 can receive a second plane based on the second coordinate system 704 (e.g., as measured by the correction source 502). In some embodiments, the augmented-reality device 304 can map the first plane to the second plane for aligning the first coordinate system 702 to the second coordinate system 704. The augmented-reality device 304 may use other suitable techniques or combination of techniques for aligning the first coordinate system 702 and the second coordinate system 704.

Figure 8:
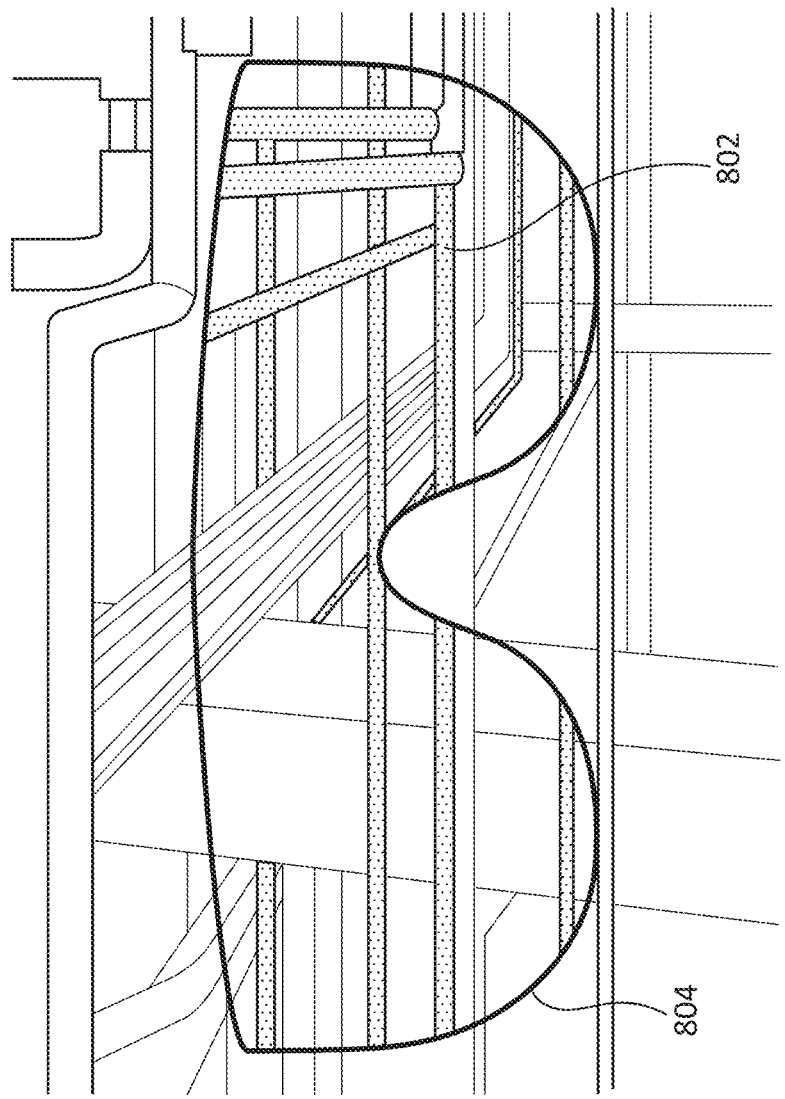
FIG. 8 depicts an embodiment of a presentation of a virtual object using an augmented-reality device.

FIG. 8 depicts an embodiment of a presentation of a virtual object 802 using the augmented-reality device. As illustrated, the virtual object 802 is seen through a display 804 (e.g., Microsoft's HoloLens, etc.) of the augmented-reality device. The augmented-reality device, after aligning the first coordinate system 702 with the second coordinate system 704 or performing other suitable tasks, displays the virtual object 802 (e.g., that may be stored in memory of the augmented-reality device or other suitable storage locations). For example, the virtual object 802 can be or otherwise include part of an electronic model, such as as-built or to-be built construction (e.g., pipes, electrical, HVAC, walls, floors, ceilings, windows, framing, fastener points, etc.), and the virtual object 802 can be generated by the augmented-reality device 304 and displayed by the augmented-reality device 304 via the display 804. The virtual object 802 is presented to the user based on a model aligned with the environment (e.g., based on aligning the coordinate system of the augmented-reality device with the correction source as described in FIG. 7). Accordingly, a user of the augmented-reality device can make measurements and/or perform other suitable tasks (e.g., layout, verifying as-built construction, etc.). In some embodiments, the head-mounted display stores and/or uses a model of the environment. By using the mobile reference (e.g., a pole with a reflector or GNSS receiver) and the correction source (e.g., a total station or GNSS signals), tasks, such as layout, can be performed much more precisely and/or conveniently than using the head-mounted display and static correction sources. In some embodiments, non-corrected GNSS signals are used as the correction source for positioning and/or orienting the head-mounted display; in some embodiments, corrected GNSS signals are used for the correction source for positioning and/or orienting the head-mounted display.

Figure 9:
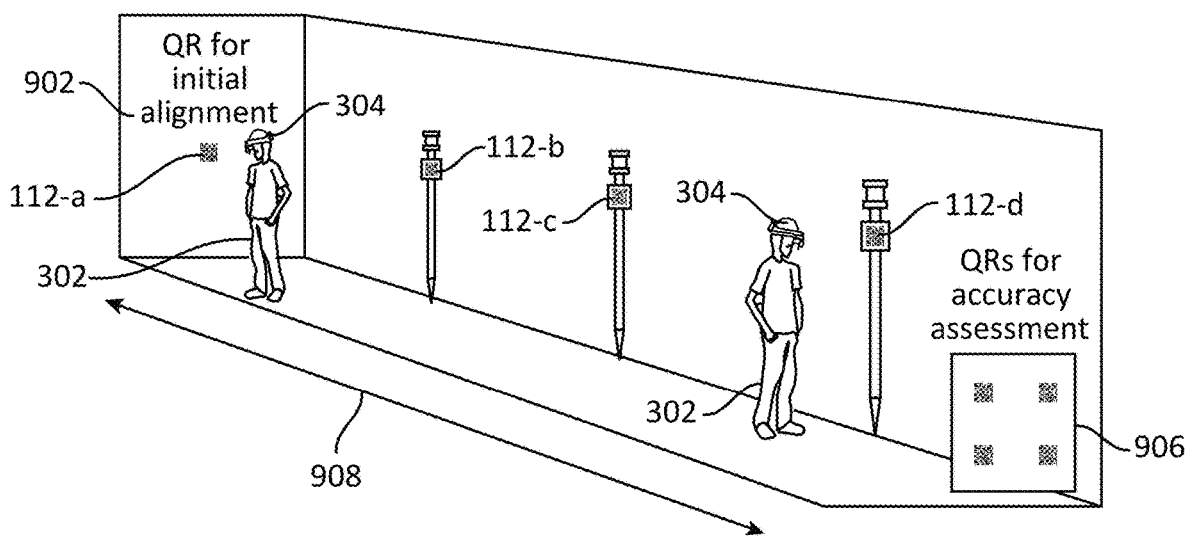
FIG. 9 depicts an embodiment of an accuracy test using an apparatus that includes a surveying rod, a correction source, a reflector, and a tracking object having a visual design.

FIG. 9 depicts an embodiment of an accuracy test using an apparatus that includes a surveying rod 100, a correction source 502, a reflector 108, and a visual design 112. As illustrated, the accuracy involves an initialization station 902, ongoing corrections, and an accuracy testing station 906. In the accuracy test, a user 302 that uses the augmented-reality device 304 begins by looking at (or otherwise adjusting the line-of-sight of the camera of the augmented-reality device 304 toward) a first visual design 112-a that is positioned at the initialization station 902. By looking at the first visual design 112-a, the user 302 may cause the augmented-reality device 304 to initialize (e.g., align a virtual-world coordinate system to a coordinate system of the environment 504, etc.). In some embodiments (e.g., relating to the accuracy test or other, real-world applications), the reference frame of the augmented-reality device 304 is aligned with the environment during initialization and realigned as it passes the visual designs 112. Upon initialization of the augmented-reality device 304 at the initialization station 902, the user 302 proceeds along path 908 that extends from the initialization station 902 to the accuracy testing station 906. While the user 302 proceeds along the path 908, the augmented-reality device 304 generates a virtual-world representation of the environment. For example, the augmented-reality device 304 can measure the environment 504 (e.g., based on one or more images captured by the camera of the augmented-reality device 304 and using an imaging algorithm such as the Simultaneous Localization And Mapping (SLAM) algorithm; or by using a depth camera) and can generate a representation of the environment.

Along the path 908, visual designs 112 are placed at periodic intervals. The visual designs 112 were placed at periodic intervals to reduce complexity of testing and could be placed differently for different applications. Visual designs 112 can be every few meters or other suitable length for correcting drift in generation of the virtual world by the augmented-reality device 304. In some embodiments, drift can be 1%-2% of distance traveled. The visual designs 112 in FIG. 9 are precisely placed (e.g., positions of the visual designs are surveyed previously), and are used to simulate the user 302 walking with a surveying rod while a correction source calculates a position of a reflector on the surveying rod.

The user 302 approaches and images a visual design 112, causing the augmented-reality device 304 to correct drift in generating the virtual representation of the environment. For example, the user 302 can approach visual design 112-b for causing the augmented-reality device 304 to correct drift accumulated in the virtual representation between the initialization station 902 and the visual design 112-b. In capturing an image of the visual design 112-b, the augmented-reality device 304 may determine a precise position of the augmented-reality device 304 in the environment 504 and can use the precise position to correct accumulated drift in the virtual representation of the environment. The user 302 proceeds to image the visual design 112-c for correcting drift accumulated between the visual design 112-b and the visual design 112-c. The user 302 proceeds to image the visual design 112-d for correcting drift accumulated between the visual design 112-c and the visual design 112-d.

After imaging visual design 112-d, and the augmented-reality device 304 correcting for drift, the user 302 approaches the accuracy testing station 906, which also includes visual designs. As illustrated, the visual designs of the accuracy testing station 906 are arranged in a rectangular pattern, but can be otherwise suitably arranged for testing accuracy. The user 302 can look at the accuracy testing station 906 to image visual designs on the accuracy testing station 906. The augmented-reality device 304, in response to capturing an image of one or more of the visual designs on the accuracy testing station 906, can calculate an error between a location of a visual design on the accuracy testing station 906 and placement of the visual design in a local coordinate system of the augmented-reality device 304. In some embodiments, the error is equal to or less than 10, 5, 3, 2, 1, 0.75, 0.5, or 0.2 centimeters.

In some embodiments, visual designs 112 are placed at known positions for correction of error during use (e.g., and not just testing) of the augmented-reality device 304. In some embodiments, the visual design 112 on a surveying rod (e.g., surveying rod 100 in FIG. 1) is used to allow the user 302 to correct for drift more frequently and/or more conveniently (e.g., the user 302 can simply look at the visual design on the surveying rod), which is moved by the user 302, instead of having to approach a stationary visual design 112. For example, as long as the augmented-reality device 304 is pointed at the visual design 112, approximately zero drift will accumulate regardless of the motion of the surveying rod 100. Additionally, the augmented-reality device 304 can briefly be adjusted to look away from the visual design 112 to place points or other features in the virtual representation of the environment with high precision.

Figure 10:
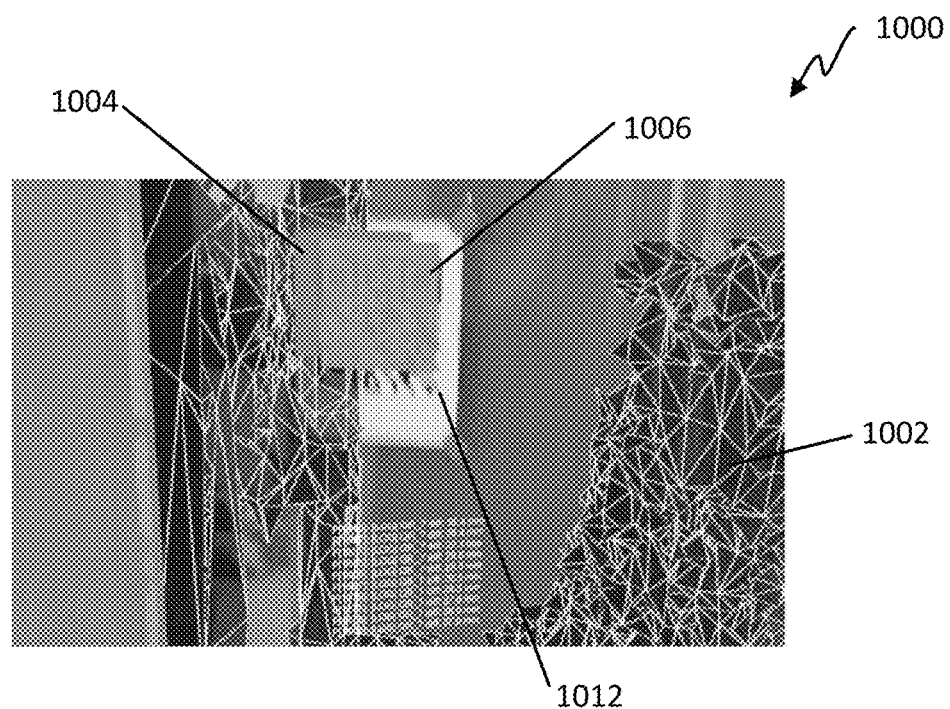
FIG. 10 depicts an example of a result of an accuracy test.

FIG. 10 depicts an example of a result of an accuracy test. Illustrated in FIG. 10 is an example of an output 1000 from an augmented-reality device. The output 1000 can be generated by the augmented-reality device in response to the user looking at (or otherwise adjusting the field-of-view of the augmented-reality device 304 toward) a visual design 1012 on the accuracy testing station 906 of FIG. 9.

The output 1000 includes a virtual representation 1002 of the environment, a virtual representation 1004 of the visual design 1012, and a ground truth 1006 of the visual design 1012. The virtual representation 1002 can be or otherwise include a mesh of objects and/or of the environment, detected by the augmented-reality device. The virtual representation 1004 of the visual design 1012 can be or otherwise include a square or other suitable shape that is positioned at the location of the visual design 1012 in the virtual representation of the environment. The ground truth 1006 of the visual design 1012 can be or otherwise include a square or other suitable shape that is positioned at the location of the visual design 1012 in the environment.

As shown in FIG. 10, the virtual representation 1004 of the visual design 1012 and the ground truth 1006 of the visual design 1012 do not perfectly overlap. But, the error between the virtual representation 1002 of the environment and the ground truth 1006 may be minimized or otherwise optimized due the correction performed by the augmented-reality device. For example, while the error between the virtual representation 1004 of the visual design 1012 and the ground truth 1006 may be less than or about 3 centimeters, the error between the virtual representation 1004 of the visual design 1012 and the ground truth 1006 may exceed 20, 50, 100 or more centimeters if correction is not performed by the augmented-reality device. In the embodiment shown, there was about only 3 cm of error while the user traveled 33 meters, correcting for drift along the way (e.g., as shown in FIG. 9). Error from correction using the visual design is roughly static.

Figure 11:
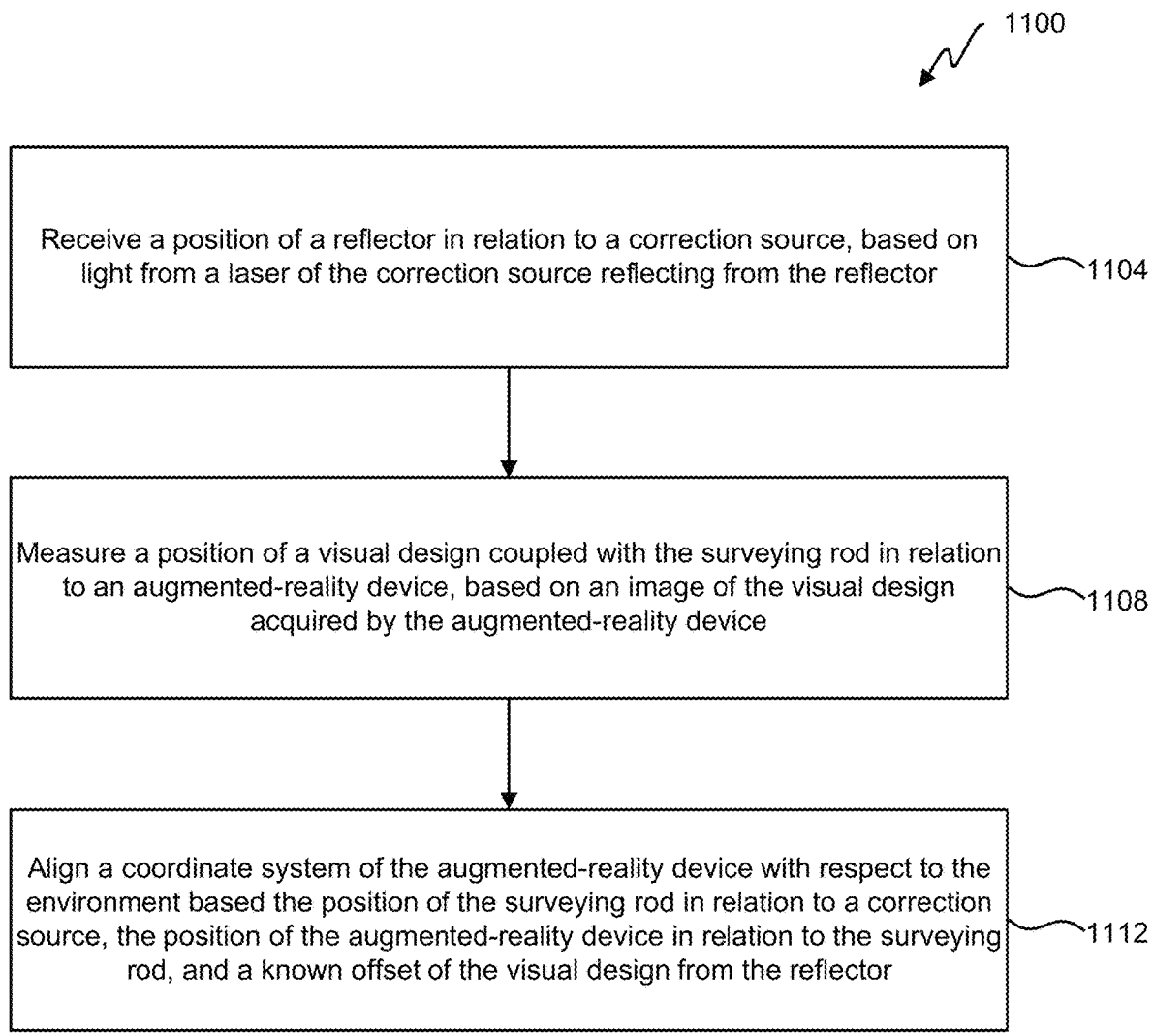
FIG. 11 illustrates a flowchart of an embodiment of a process for aligning an augmented-reality device with an environment.

In FIG. 11, a flowchart of an embodiment of a process 1100 for aligning an augmented-reality device 304 with an environment 504 is shown. In some embodiments, the process 1100 is performable by an apparatus that includes a correction source 502, a surveying rod 100 having a reflector 108 and a visual design 112, the augmented-reality device 304, and/or other components (e.g., components shown in FIG. 5).

One purpose of process 1100 can include to align two coordinate systems: (1) a coordinate system of the augmented-reality device, e.g., an XR10 coordinate system; and (2) a coordinate system that the correction source uses, e.g., a robotic total station (RTS) coordinate system. To align two coordinate systems, an object that is visible and measurable in both the augmented-reality device and the correction source is used to align the two coordinate systems.

The correction source (e.g., RTS) provides a position of the reflector in the RTS coordinate system. The augmented-reality device can measure a position of the reflector in the augmented-reality device coordinate system. However, it is easier, in some embodiments, for the augmented-reality device if a visual design (e.g., QR code) with a known offset to the reflector is used, because augmented-reality device can more easily detect and provide a position and/or orientation of the visual design. Thus the augmented-reality (AR) device detects the visual code and can obtain position of the reflector in the AR device coordinate system.

Initial alignment. Once 3 reflector positions are obtained (or 2 reflector position and ground plane, which the AR device can provide) in both coordinate systems, the two coordinate systems can be aligned (e.g., after initial alignment, a user can see a hologram placed at correction position).

Ongoing alignment. The AR device drifts as it travels over distance. Once one reflector position after the initial alignment is obtained in both coordinate systems, the two coordinate systems can be realigned. For example, the user looks at the QR code, intentionally or unintentionally, and/or the AR device receives a position of the reflector from the RTS corresponding to a time when the user looked at the QR code.

The AR device coordinate system is aligned with the correction source coordinate system (e.g., the environment) to show a digital model accurately aligned with the real world through the AR device (e.g., initial alignment). The digital model drifts as the AR device moves. To reduce and/or minimize drift, ongoing alignment is used.

The correction source coordinate system is the main reference coordinate system at a job site and is established (e.g., using stationing). The correction source coordinate system can be referred to as the reference coordinate system, the main coordinate system, the RTS coordinate system, the GNSS coordinate system, the job site coordinate system, and/or the Building Information Model (BIM) coordinate system. After the AR device is turned on, it establishes its own coordinate system (e.g., the origin is where the AR device is turned on. The AR device maps the environment in the AR coordinate system. In some embodiments, the mapped environment by the AR Device is not used to align the two coordinate systems.

To align two coordinate systems, three common points (or two common points and the ground plane) that are visible and (precisely) measurable in the both coordinate systems can be used. Some existing methods use multiple QR codes fixed on planes (walls). A QR code is put on a wall measured in the RTS coordinate system. The RTS measures the position (e.g., X, Y, Z) of the top left of the QR code in the RTS coordinate system. The AR device calculates the position (e.g., x, y, z) of the top left of the QR code in the AR device coordinate system. The AR device has the position of the top left of the QR code in the RTS coordinate system saved in memory and aligns the AR device coordinate system to the RTS coordinate system by aligning (x, y, z) to (X, Y, Z). Some potential problems with this method is that the user has to put many QR codes around job site, the user has to measure (X, Y, Z) of the QR codes using RTS, and/or the user has to save the measured (X, Y, Z) of the QR codes into the AR device before using the AR device.

In some embodiments, the Trimble Prism Anchor method includes one or more or the following steps:

- the AR device (e.g., XR10) establishes its own coordinate system after being turned on (e.g., assuming that the AR device coordinate system is aligned with only the ground plane and the origin is at a random location, and/or the surveying rod is at a random position).
- The RTS (or other correction source) is used to measure the position of the prism (or GNSS receiver) in the correction source coordinate system.
- The AR device measures the position and orientation of the QR code (e.g., visual design 112 in FIG. 1) that is placed on the CodeCube (e.g., tracking object 110) on the surveying rod (e.g., surveying rod 100) with a known offset to the prism (e.g., reflector 108) in the AR device coordinate system.
- The AR device calculates position of the prism (e.g., reflector 108) in the AR device coordinate system using the measured position and orientation of the QR code and the known offset (e.g., 3 angles and 3 translations) from the QR code to the prism. The AR device then has the position of the prism in both RTS coordinate system and the AR device coordinate system. One purpose of this step is to get the position of the reflector in AR device coordinate system because it can be hard to measure the position of the reflector directly by AR device, therefore the QR code and offset from the QR code to the reflector is used.
- The AR device aligns the AR device coordinate system to the RTS coordinate system, after the AR device has more than 1 reflector positions, such as 3 positions or 2 positions and ground plane, in both coordinate systems (e.g., for initialization), or after getting a new position of the reflector as the surveying rod moves (e.g., for updating/ongoing alignment).

Measuring a Position of the Surveying Rod in the Environment

Process 1100 begins in step 1104 with receiving a position of a reflector in relation to a correction source. The reflector (e.g., reflector 108 in FIG. 5) is coupled with, and/or part of, the surveying rod (e.g., surveying rod 100 in FIG. 5). The reflector is positioned on a first end (e.g., the top; first end 102 in FIG. 1) of the surveying rod. A correction source (e.g., correction source 502 in FIG. 5) having a laser (e.g., laser 601 in FIG. 6) is used to measure the position of the surveying rod (e.g., a center point of the reflector of the surveying rod) with respect to the correction source. For example, the position of the correction source in the environment is known, and the laser of the correction source emits light that contacts or otherwise reflects from the reflector of the surveying rod. Based on the reflection (e.g., off of the reflector) of the light from the laser, the correction source calculates the position (e.g., spatial X, Y, Z coordinates) of the surveying rod in the environment. In some embodiments, a user of the surveying rod can move the surveying rod to more than one position (e.g., two positions, three positions, four positions, etc.) in the environment for aligning the augmented-reality device with respect to the environment 504.

Measuring a Position of a Visual Design with Respect to the Augmented-Reality Device In step 1108, a position of a visual design, coupled with the surveying rod, is measured with respect to the augmented-reality device. In some embodiments, the user can wear or otherwise use the augmented-reality device and can look at (or otherwise adjust a line-of-sight of the augmented-reality device toward, such as pointing a camera of a smartphone or tablet toward) the visual design. The user can look at the surveying rod or component thereof. For example, the surveying rod can include a tracking object (e.g., tracking object 110 in FIG. 2) that includes the visual design.

As illustrated in FIG. 1, the visual design 112 is printed on the tracking object 110. In other examples, the augmented-reality device may calculate a relative position of the augmented-reality device by looking at or otherwise tracking other objects. For example, the augmented-reality device (e.g., via machine-learning or the like) can track objects (e.g., monopods, bipods, tripods, a prism pole such as the surveying rod 100 as-a-whole, a prism, a vacuum cleaner or other household item, lawn equipment, such as tracking a shape of a lawn mower, heavy equipment, such as a tractor or excavator, etc.) with predetermined shapes for determining the relative location of the augmented-reality device (e.g., assuming the position and/or orientation of the object is known). Accordingly, if the surveying pole (or portion of the surveying pole) is farther away (e.g., farther away from the user than 1 or 2 meters) other objects and/or visual designs can be used for tracking using the augmented-reality device. In another example, a user wears an augmented-reality device while operating a dozer. The dozer has a target (e.g., visual design) in the cab of the dozer. The target has a known offset from a reflector (e.g., prism) and/or GNSS receiver affixed to the dozer (on top of the cab or on a blade of the dozer). The coordinate system of the augmented-reality device is able to align with the environment based on the user looking at the target, even though the dozer travels far within the environment.

The augmented-reality device can be adjusted to capture an image of the visual design. The image of the visual design is received by the augmented-reality device and is used by the augmented-reality device to calculate the relative position of the visual design with respect to the augmented-reality device. For example, the augmented-reality device can capture the image of the visual design, determine that the visual design corresponds to the surveying rod, receive a position (e.g., an (x, y, z) position) of the surveying rod in the environment, and calculate the position (e.g., an (a, b, c) corresponding to an (x', y', z') position) of the visual design in relation to the augmented-reality device. Additionally, the visual design can provide or imply an orientation of the augmented-reality device (e.g., since the size and/or shape of the visual design is known, the augmented-reality device can deduce its orientation, or angle of viewing, based on the image of the visual design).

In some embodiments, step 1108 can be performed each time a user moves the surveying rod. For example, the augmented-reality device calculates a first relative position of the visual design with respect to the augmented-reality device (and/or then proceeds to step 1112), then the user moves the surveying rod to a different position in the environment and causes the process 1100, or subset thereof, to repeat. In embodiments in which the position of the augmented-reality device is being updated, the position can be updated independent from the angle or line-of-sight of the augmented-reality device with respect to the correction source (though the augmented-reality device could be in line of sight with the visual design and the reflector could be in line of sight with respect to the correction source).

While described with respect to a visual design, determining the relative position of the augmented-reality device can additionally or alternatively be performed by detecting an object (e.g., a tracking object 110 in FIG. 1) directly. For example, the camera of the augmented-reality device can capture an image of an object and can use machine-learning, artificial intelligence, computer vision algorithms, and/or other suitable techniques to detect the object and determine the relative position of the augmented-reality device.

Aligning the Augmented-Reality Device with the Environment

In step 1112 a coordinate system of the augmented-reality device is aligned with respect to the environment (e.g., as described in conjunction with the description of FIG. 7). The augmented-reality device aligns itself (or can otherwise be aligned) with the environment based on the position of the surveying rod (e.g., the reflector) with respect to the correction source, the position of the visual design with respect to the augmented-reality device, a known offset between the visual design and the reflector, and/or the position of the correction source with respect to the environment. The known offset is a distance that is known that extends from the visual design 112 to the reflector 108. In some embodiments, the known offset can be from 5 centimeters to 150 centimeters or other suitable distance. The known offset can be adjusted or otherwise selected to optimize a usability and/or accuracy/precision associated with the system. In some embodiments, the coordinate system of the augmented reality-device is aligned with the environment by aligning the coordinate system of the augmented-reality device with respect to the coordinate system of the correction source (e.g., the correction source is precisely positioned in the environment so that the coordinate system of the correction source is aligned with the environment). In some embodiments, the method further comprises the augmented-reality device displaying a graphic (e.g., overlay) with respect to the environment on a display of the augmented-reality device (e.g., after step 1112) and/or measuring a point or feature using the augmented-reality device (e.g., after step 1112). In some embodiments, the overlay is from a memory device of the augmented-reality display previously stored in the memory. In some embodiments, the overlay is streamed (e.g., from the cloud) to the augmented-reality device.

In some embodiments, aligning the augmented-reality device (e.g., with respect to the correction source and/or with the environment) can involve the augmented-reality device (or other suitable computing system and/or device)

adjusting a first coordinate system of the virtual representation of the environment (e.g., the augmented-reality device coordinate system) to match a second coordinate system (e.g., the coordinate system of the correction source and/or the environment). The augmented-reality device can map the first coordinate system to the second coordinate system. In some embodiments, by aligning the first coordinate system and the second coordinate system, the augmented-reality device determines a position and/or an orientation for the augmented-reality device in the environment.

Figure 12:
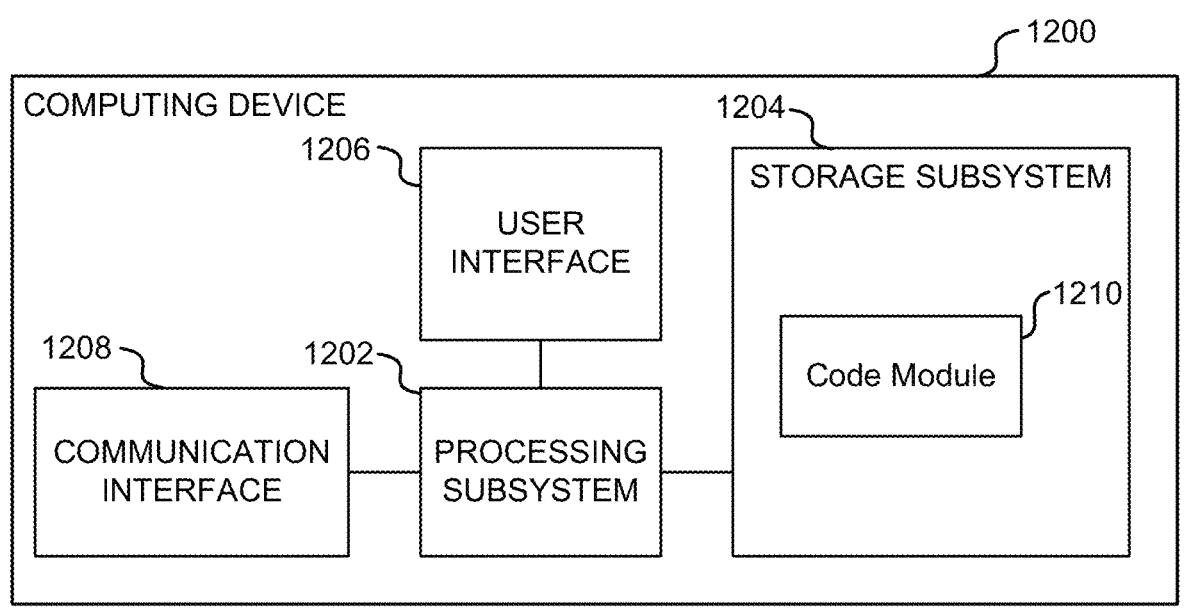
FIG. 12 depicts a block diagram of an embodiment of a computer system.

FIG. 12 is a simplified block diagram of a computing device 1200. Computing device 1200 can implement some or all functions, behaviors, and/or capabilities described above that would use electronic storage or processing, as well as other functions, behaviors, or capabilities not expressly described. Computing device 1200 includes a processing subsystem 1202, a storage subsystem 1204, a user interface 1206, and/or a communication interface 1208. Computing device 1200 can also include other components (not explicitly shown) such as a battery, power controllers, and other components operable to provide various enhanced capabilities. In various embodiments, computing device 1200 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 1204 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 1204 can store one or more applications and/or operating system programs to be executed by processing subsystem 1202, including programs to implement some or all operations described above that would be performed using a computer. For example, storage subsystem 1204 can store one or more code modules 1210 for implementing one or more method steps described above.

A firmware and/or software implementation may be implemented with modules (e.g., procedures, functions, and so on). A machine-readable medium tangibly embodying instructions may be used in implementing methodologies described herein. Code modules 1210 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 1210) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 1210 may comprise sets of instructions (codes) embodied on a computer-readable medium that directs a processor of a computing device 1200 to perform corresponding actions. The instructions may be configured to run in sequential order, in parallel (such as under different processing threads), or in a combination thereof. After loading a code module 1210 on a general purpose computer system, the general purpose computer is transformed into a special purpose computer system.

Computer programs incorporating various features described herein (e.g., in one or more code modules 1210) may be encoded and stored on various computer readable storage media. Computer readable media encoded with the program code may be packaged with a compatible electronic device, or the program code may be provided separately from electronic devices (e.g., via Internet download or as a separately packaged computer-readable storage medium). Storage subsystem 1204 can also store information useful for establishing network connections using the communication interface 1208.

User interface 1206 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 1206 to invoke the functionality of computing device 1200 and can view and/or hear output from computing device 1200 via output devices of user interface 1206. For some embodiments, the user interface 1206 might not be present (e.g., for a process using an ASIC).

Processing subsystem 1202 can be implemented as one or more processors (e.g., integrated circuits, one or more single-core or multi-core microprocessors, microcontrollers, central processing unit, graphics processing unit, etc.). In operation, processing subsystem 1202 can control the operation of computing device 1200. In some embodiments, processing subsystem 1202 can execute a variety of programs in response to program code and can maintain multiple concurrently executing programs or processes. At a given time, some or all of a program code to be executed can reside in processing subsystem 1202 and/or in storage media, such as storage subsystem 1204. Through programming, processing subsystem 1202 can provide various functionality for computing device 1200. Processing subsystem 1202 can also execute other programs to control other functions of computing device 1200, including programs that may be stored in storage subsystem 1204.

Communication interface 1208 can provide voice and/or data communication capability for computing device 1200. In some embodiments, communication interface 1208 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 1208 can provide wired connectivity (e.g., universal serial bus, Ethernet, universal asynchronous receiver/transmitter, etc.) in addition to, or in lieu of, a wireless interface. Communication interface 1208 can be implemented using a combination of hardware (e.g., driver circuits, antennas, modulators/demodulators, encoders/decoders, and other analog and/or digital signal processing circuits) and software components. In some embodiments, communication interface 1208 can support multiple communication channels concurrently. In some embodiments, the communication interface 1208 is not used.

It will be appreciated that computing device 1200 is illustrative and that variations and modifications are possible. A computing device can have various functionality not specifically described (e.g., voice communication via cellular telephone networks) and can include components appropriate to such functionality.

Further, while the computing device 1200 is described with reference to particular blocks, it is to be understood that these blocks are defined for convenience of description and are not intended to imply a particular physical arrangement of component parts. For example, the processing subsystem 1202, the storage subsystem 1204, the user interface 1206, and/or the communication interface 1208 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Electronic devices described herein can be implemented using computing device 1200.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

What is claimed is:

1. A system for aligning an augmented-reality device with an environment, the system comprising:
  a visual design comprising an arrangement of lines or shapes, the visual design configured to be supported by a surveying rod at a known fixed offset from a device coupled with the surveying rod, wherein the device coupled with the surveying rod is part of a surveying system and is different than the augmented-reality device;
  the augmented-reality device, wherein the augmented-reality device comprises a camera; and
  one or more processors configured to:
    receive a position of the device coupled with the surveying rod in relation to a device comprising a laser,
    measure a position of the visual design in relation to the augmented-reality device, based on an image of the visual design acquired by the camera of the augmented-reality device; and
    align a coordinate system of the augmented-reality device with respect to the environment, based on the position of the device coupled with the surveying rod in relation to the device comprising the laser, the position of the visual design in relation to the augmented-reality device, and the known fixed offset of the visual design from the device coupled with the surveying rod.

2. The system of claim 1, wherein:
the device coupled with the surveying rod is a reflector;
the device comprising the laser is a robotic total station; and
the position of the reflector in relation to the robotic total station is measured using light from a laser reflecting from the reflector.

3. The system of claim 1, further comprising
a receiver for a global navigation satellite system (GNSS) attached to the surveying rod.

4. The system of claim 1, wherein the visual design is a two-dimensional, machine-readable code, and wherein the visual design is affixed to a box that is configured to be supported by surveying rod.

5. The system of claim 4, wherein the two-dimensional, machine-readable code is a QR code or an April Tag.

6. The system of claim 4, wherein the two-dimensional, machine-readable code is one of a plurality of two-dimensional, machine-readable codes coupled with the surveying rod.

7. The system of claim 1, wherein the known fixed offset between the device coupled with the surveying rod and the visual design is equal to or less than 5 or 10 centimeters.

8. The system of claim 1, wherein the known fixed offset between the device coupled with the surveying rod and the visual design is equal to or greater than 20, 25, 30, 40, or 45 centimeters and/or equal to or less than 80, 90, 100, or 150 centimeters.

9. The system of claim 1, wherein a length of the surveying rod is equal to or greater than 1.7, 1.8, or 2 meters and/or equal to or less than 1.9, 2, or 2.2 meters.

10. The system of claim 1, wherein a length and/or width of the visual design is equal to or greater than 1.75 or 2 inches and equal to or less than 4 or 5 inches.

11. The system of claim 1, wherein:
the augmented-reality device comprises a display;
the augmented-reality device further comprises a model of an object, stored in memory of the augmented-reality device; and
the one or more processors are further configured to present the model of the object in relation to the environment on the display of the augmented-reality device, based on aligning the coordinate system of the augmented-reality device with respect to the environment.

12. The system of claim 1, wherein measuring the position of the device coupled with the surveying rod in relation to the device comprising the laser comprises measuring a center of a reflector in relation to the device comprising the laser, using the laser.

13. The system of claim 1, wherein the device comprising the laser is a robotic total station.

14. A method for aligning an augmented-reality device with an environment, the method comprising:
receiving a position of a device coupled with a surveying rod in relation to a device comprising a laser, wherein the device comprising the laser is aligned relative to the environment, and wherein the device coupled with the surveying rod is different than the augmented-reality device;
measuring a position of a visual design in relation to the augmented-reality device, the visual design comprising an arrangement of lines or shapes, wherein:
the visual design is coupled with the surveying rod at a known fixed offset from the device coupled with the surveying rod; and
measuring the position of the visual design is based on an image of the visual design acquired by a camera of the augmented-reality device; and
aligning a coordinate system of the augmented-reality device with respect to the environment, based on the position of the device coupled with the surveying rod in relation to the device comprising the laser, the position of the visual design in relation to the augmented-reality device, and the known fixed offset of the visual design from the device coupled with the surveying rod.

15. The method of claim 14, wherein the device coupled with the surveying rod is a reflector and the position of the device coupled with the surveying rod in relation to the device comprising the laser is calculated based on light from the laser of the device comprising the laser reflecting from the reflector.

16. The method of claim 14, wherein the device coupled with the surveying rod is a global navigation satellite system (GNSS) receiver and the device comprising the laser is one or more satellites of the GNSS.

17. The method of claim 14, further comprising presenting a model of an object in relation to the environment on a display of the augmented-reality device, based on aligning the coordinate system of the augmented-reality device with respect to the environment.

18. A memory device comprising instructions that, when executed, cause one or more processors to perform the following steps for aligning an augmented-reality device with an environment:
receiving a position of a reflector of a surveying rod in relation to a device comprising a laser, based on light from the laser of the device comprising the laser reflecting from the reflector, wherein the device comprising the laser is aligned relative to the environment;
measuring a position of a visual design in relation to the augmented-reality device, the visual design comprising an arrangement of lines or shapes, wherein:
the visual design is coupled with the surveying rod at a known fixed offset from the reflector; and
measuring the position of the visual design is based on an image of the visual design acquired by a camera of the augmented-reality device; and
aligning a coordinate system of the augmented-reality device with respect to the environment, based on the position of the reflector in relation to the device comprising the laser, the position of the visual design in relation to the augmented-reality device, and the known fixed offset of the visual design from the reflector.

19. The memory device of claim 18 wherein the instructions, when executed, cause the one or more processors to perform the following step: presenting a model of an object in relation to the environment on a display of the augmented-reality device, based on aligning the coordinate system of the augmented-reality device with respect to the environment.

20. The memory device of claim 18 wherein the visual design is a two-dimensional, machine-readable code.

* * * * *